(12) United States Patent
Ginzburg et al.

(10) Patent No.: US 9,633,407 B2
(45) Date of Patent: Apr. 25, 2017

(54) CPU/GPU SYNCHRONIZATION MECHANISM

(75) Inventors: Boris Ginzburg, Haifa (IL); Esfirush Natanzon, Haifa (IL); Ilya Osadchiy, Haifa (IL); Yoav Zach, Karkur (IL)

(73) Assignee: Intel Corporation, Santa Clara, CA (US)

( * ) Notice: Subject to any disclaimer, the term of this patent is extended or adjusted under 35 U.S.C. 154(b) by 41 days.

(21) Appl. No.: 13/193,779

(22) Filed: Jul. 29, 2011

(65) Prior Publication Data

US 2013/0027410 A1    Jan. 31, 2013

(51) Int. Cl.
  *G06F 15/00* (2006.01)
  *G06T 1/20* (2006.01)
  *G06T 1/60* (2006.01)

(52) U.S. Cl.
  CPC . *G06T 1/20* (2013.01); *G06T 1/60* (2013.01)

(58) Field of Classification Search
  CPC .... G06F 9/4843; G06F 9/3851; G06F 9/3885; G06F 11/3419
  USPC ....................................................... 345/501
  See application file for complete search history.

(56) References Cited

U.S. PATENT DOCUMENTS

| | | | |
|---|---|---|---|
| 5,440,746 A | 8/1995 | Lentz | |
| 7,631,309 B2 | 12/2009 | Wilt et al. | |
| 7,773,090 B1 | 8/2010 | Diard et al. | |
| 8,368,701 B2 | 2/2013 | Paltashev et al. | |
| 8,413,151 B1 * | 4/2013 | Stratton | G06F 9/4843 712/22 |
| 2004/0230794 A1 * | 11/2004 | England et al. | 713/164 |
| 2006/0117316 A1 * | 6/2006 | Cismas | G06F 9/3851 718/103 |
| 2007/0222798 A1 | 9/2007 | Kuno | |
| 2009/0327662 A1 * | 12/2009 | Jiang | G06F 9/3838 712/217 |
| 2010/0122259 A1 | 5/2010 | Gosalia et al. | |
| 2010/0153686 A1 * | 6/2010 | Frank | 712/34 |
| 2011/0067038 A1 | 3/2011 | Troccoli | |
| 2013/0125133 A1 * | 5/2013 | Schuster | G06F 9/5083 718/105 |

FOREIGN PATENT DOCUMENTS

| | | |
|---|---|---|
| CN | 1523500 C | 4/2007 |
| CN | 101398753 A | 4/2009 |
| CN | 1818874 C | 1/2010 |
| CN | 101685391 A | 3/2010 |
| CN | 102103567 A | 6/2011 |

OTHER PUBLICATIONS

PCT International Search Report and Written Opinion issued in corresponding PCT/US2012/044805 dated Jan. 25, 2013 (9 pages).

(Continued)

*Primary Examiner* — Peter Hoang
(74) *Attorney, Agent, or Firm* — Alpine Technology Law Group LLC

(57) ABSTRACT

A thread on one processor may be used to enable another processor to lock or release a mutex. For example, a central processing unit thread may be used by a graphics processing unit to secure a mutex for a shared memory.

20 Claims, 4 Drawing Sheets

(56) References Cited

OTHER PUBLICATIONS

Liu, W., Lewis, B., Zhou, X., Chen, H., Gao, Y., Yan, S., Luo, S., Saha, B.: A Balanced Programming Model for Emerging Heterogeneous Multicore Systems.
Chinese Office Action issued in corresponding CN patent application 201280037791.4 dated (9 pages).
European Search Report from counterpart European Patent Application No. EP12819390.1, dated Apr. 16, 2015, 7 pages.
Shucai Xiao, et al., "On the Robust Mapping of Dynamic Programming onto a Graphics Processing Unit," 2009 $15^{th}$ International Conference on Parallel and Distributed Systems, 2009 IEEE, pp. 26-33.
Shucai Xiao, et al., "Inter-Block GPU Communication via Faster Barrier Synchronization," 2010 IEEE, 12 pages.
Wu-Chen Feng, et al., "To GPU Synchronize or Not GPU Synchronize?," 2010 IEEE, pp. 3801-3804.

\* cited by examiner

CPU/GPU SYNCHRONIZATION MECHANISM

BACKGROUND

This relates generally to computers that have general purpose processors and graphics processing units.

The memory used by user applications running on the general purpose or central processing unit and the memory used by a graphics processing unit are typically separated. A graphics processing unit driver copies data from the user space into driver memory for processing on a graphics processing unit. In a shared virtual memory model, data is not copied to the graphics processing unit, but, instead, it is shared between the graphics processing unit and the central processing unit.

Currently, in multithreaded applications, shared data is protected by locks called mutexes. Each thread that wants to access shared data must first lock a corresponding mutex to prevent other threads from accessing that mutex. This locking can be done through "spinning" on lock, but this technique is not efficient from power and performance points of view.

To optimize the central processing unit, the operating system provides system calls that allow a thread to sleep until a mutex is available and then notifies other threads when a mutex is unlocked. But this mechanism works only for threads that run on central processing unit cores.

DETAILED DESCRIPTION

For each thread group running on a graphics processor, an auxiliary shadow thread running on the central processing unit may be created, in one embodiment. When a thread running on the graphics processing unit wants to lock a mutex, if it wants to wait until the thread is freed by another task, the graphics thread sends a request to a shadow thread on the central processing unit. The shadow thread on the central processing unit issues the corresponding system called to the operating system. When the operating system gives a lock to the shadow thread, the shadow thread sends the notification to the thread on the graphics processing unit.

While the term graphics processing unit is used in the present application, it should be understood that the graphics processing unit may or may not be a separate integrated circuit. The present invention is applicable to situations where the graphics processing unit and the central processing unit are integrated into one integrated circuit. As used herein, a processor or processing unit may be a processor, controller, or coprocessor.

Figure 1:
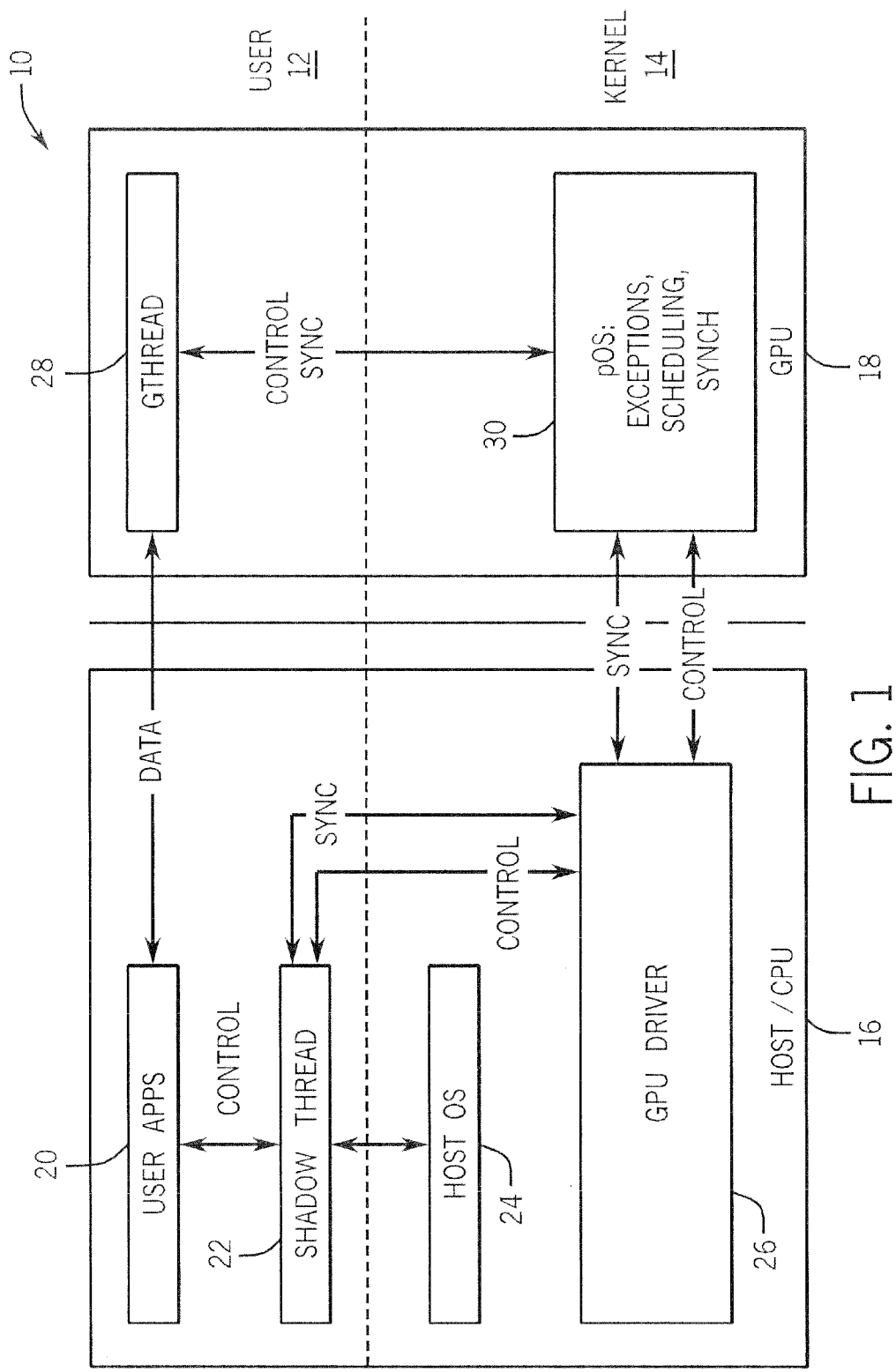
FIG. 1 is a schematic depiction of one embodiment of the present invention.

Referring to FIG. 1, a host/central processing unit 16 communicates with the graphics processing unit 18 in a processor-based system 10. The host/central processing unit 16 may be part of any processor-based system, including a hardwired or mobile device. Examples of mobile devices include cellular telephones, laptop computers, tablet computers, and mobile Internet devices, to mention a few examples. The host central processing unit 16 includes user applications 20 which provide control information to a shadow thread 22. The shadow thread 22 then communicates synchronization on sync and control information to the graphics processing unit driver 26. A shadow thread also communicates with the host operating system 24.

As shown in FIG. 1, the user level 12 includes a shadow thread 22 and the user applications 20, while the kernel level 14 includes a host operating system 24, and the graphics processing unit driver 26. The graphics processing unit driver 26 is a driver for the graphics processing unit even though that driver is resident in the central processing unit 16.

The graphics processing unit 18 includes, in user level 12, a gthread 28 which sends control and synchronization messages to the operating system (pOS) 30 and receives messages from the operating system 30. A gthread is user code that runs on the graphics processing unit, sharing virtual memory with the parent thread running on the central processing unit. The operating system 30 may be a relatively small operating system, running on the graphics processing unit, that is responsible for graphics processing unit exceptions. It is a small relative to the host operating system 24, as one example.

User applications 20 are any user process that runs on the central processing unit 16. The user applications 20 spawn threads on the graphics processing unit 18.

An eXtended Threaded Library or XTL is an extension to create and manage user threads on the graphics processing unit. This library creates the shadow thread for each gthread and has library functions for synchronization.

User applications offload computations to the graphics processing unit using an extension of a traditional multi-threaded model such as:

xthread_create (thread, attr, gpu_worker,arg).

The gthread or worker thread created on the graphics processing unit shares virtual memory with the parent thread. It behaves in the same way as a regular thread in that all standard inter-process synchronization mechanisms, such as Mutex and semaphore, can be used. At the same time, a new shadow thread is created on the host central processing unit 16. This shadow thread works as a proxy for exception handling units and synchronization between threads on the central processing unit and the graphics processing unit.

Figure 2:
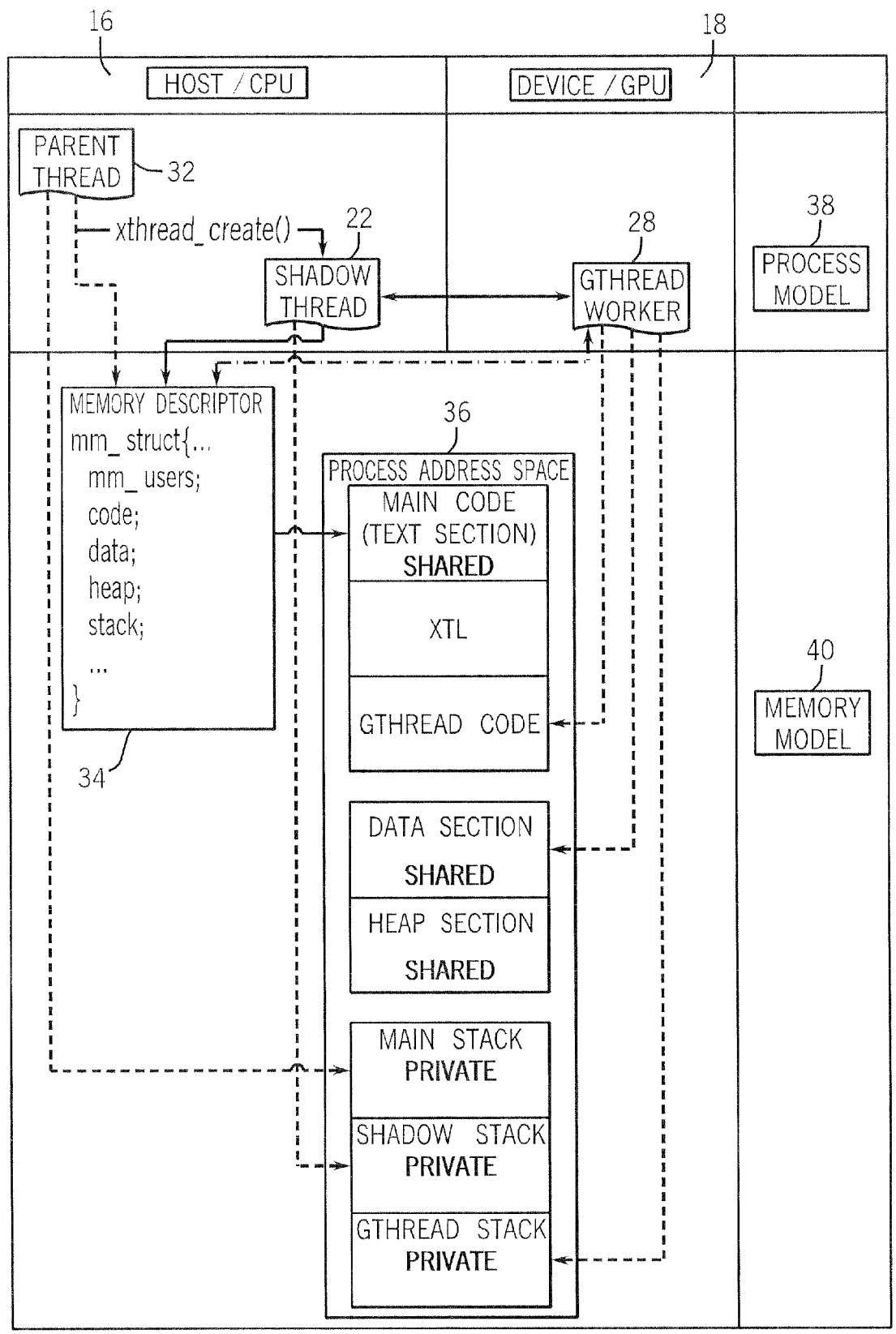
FIG. 2 is extended thread and memory model in accordance with one embodiment of the present invention.

In some embodiments, the parent thread, the host shadow thread and the graphics processing unit worker threads may share virtual memory as shown in FIG. 2. Host/central processing unit 16 includes the parent thread 32 that generates the xthread_create( ) for the shadow thread 22. The shadow thread 22 accesses the shadow stack which is a private address space in the process address space 36. The parent thread 32 also accesses the memory descriptors 34 and the main stack, which is a private address space within the process address space 36. The memory descriptors 34 may also communicate with the gthread worker 28. The gthread worker 28 can access the gthread code within the process space 36 as well as the shared data section and the private gthread stack. The material in the upper blocks corresponds to the process model 38 and the lower blocks correspond to the memory model 40.

Figure 3:
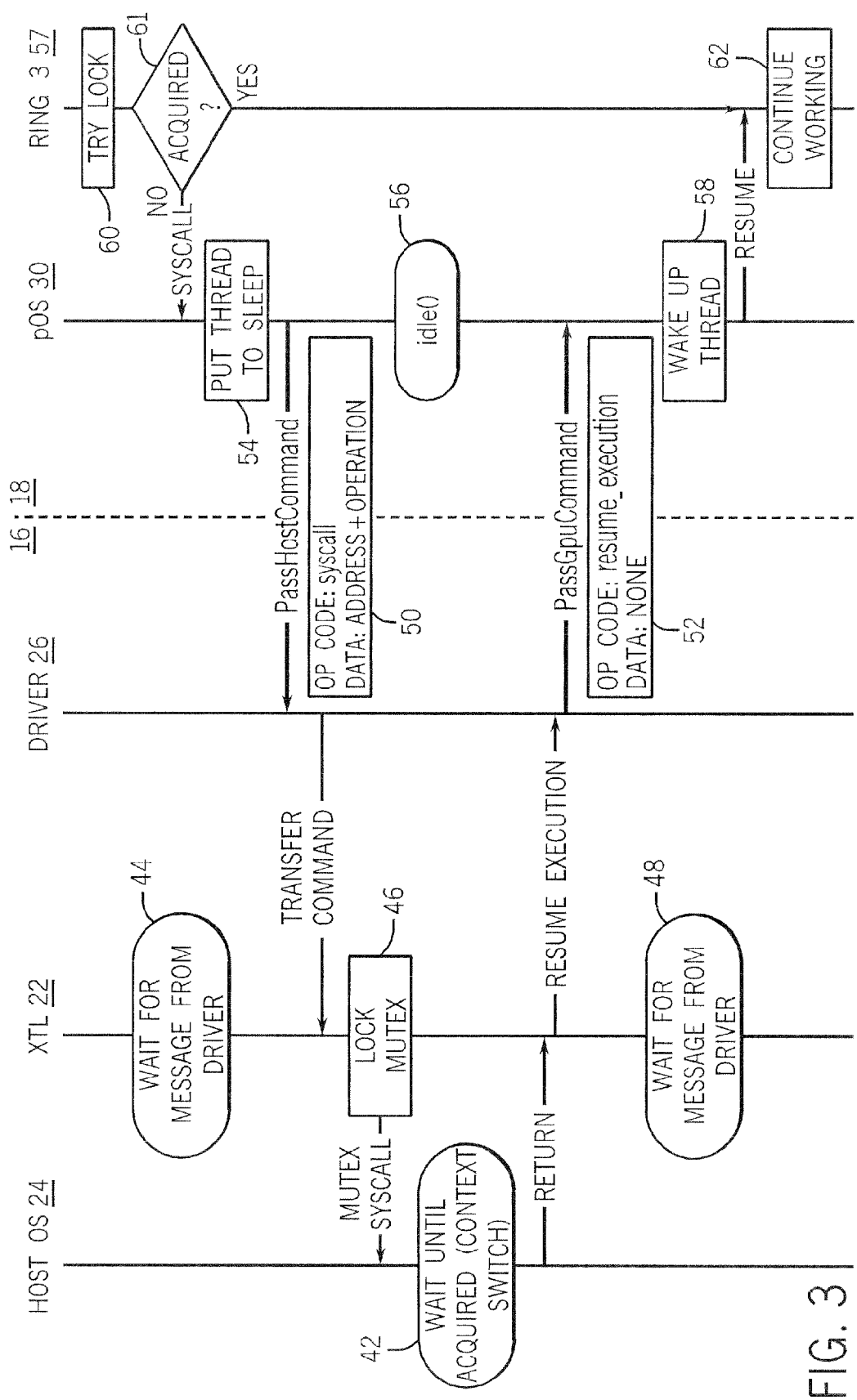
FIG. 3 is a flow chart for page fault handling in accordance with one embodiment of the present invention.

Referring to FIG. 3, the synchronization algorithms may be implemented in hardware, software and/or firmware. In software embodiments, the algorithms may be implemented as computer executable instructions stored on a non-transitory computer readable medium such as an optical, semiconductor or magnetic memory. In FIG. 3, the flows for the host operating system 24, the shadow thread 22, driver 26 of the central processing unit 16, and the operating system 30 and ring 3 57 in the graphics processing unit 18 are shown as parallel vertical flow paths with interactions between them indicated by generally horizontal arrows.

Continuing in FIG. 3, in one embodiment, at ring 3, the gthread 28 tries to acquire a mutex from the user space by spinning for a short period of time, as indicated in block 60, in column 57. If the mutex is successfully acquired, as determined in diamond 61, the program continues, as indicated in block 62. If the mutex was not acquired because it was already locked by another thread, a call to the operating system 30 ("SYSCALL") is made with an ACQUIRE op code.

In the operating system 30, the SYSCALL is received. The operating system 30 sends a message to the driver called PassHostCommand. The PassHostCommand includes an op code of SYSCALL and a data address plus operation, as indicated in block 50. Then the operating system 30 puts the calling thread to sleep, as indicated in block 54. The calling thread then goes to idle, as indicated in block 56.

The driver 26 in the central processing unit 16 transfers the message to the Xthread 22 using a transfer command. In the Xthread 22, the transfer command is received. The xthread waited for this message from the driver, as indicated at block 44. Then the Xthread performs the mutex lock, as indicated in block 46 and may include an SYSCALL to the host operating system 24. The operating system 24 waits until the mutex is acquired, (i.e. there is a context switch), as indicated at 42. After the mutex was acquired, the Xthread sends a resume execution command to the driver 26 and then waits for the next message from the driver, as indicated in block 48.

The driver 26 receives the resume execution command and sends a message PassGpuCommand to the operating system 30 in the graphics processing unit. The PassGpuCommand may include an op code of resume_execution with no data, as indicated in block 52.

The operating system 30 wakes up the thread, as indicated in block 58, and sends a resume from SYSCAL to the gthread 28. As a result, the gthread 28 continues working, as indicated in block 62. The shadow thread may also be used to release a mutex.

Figure 4:
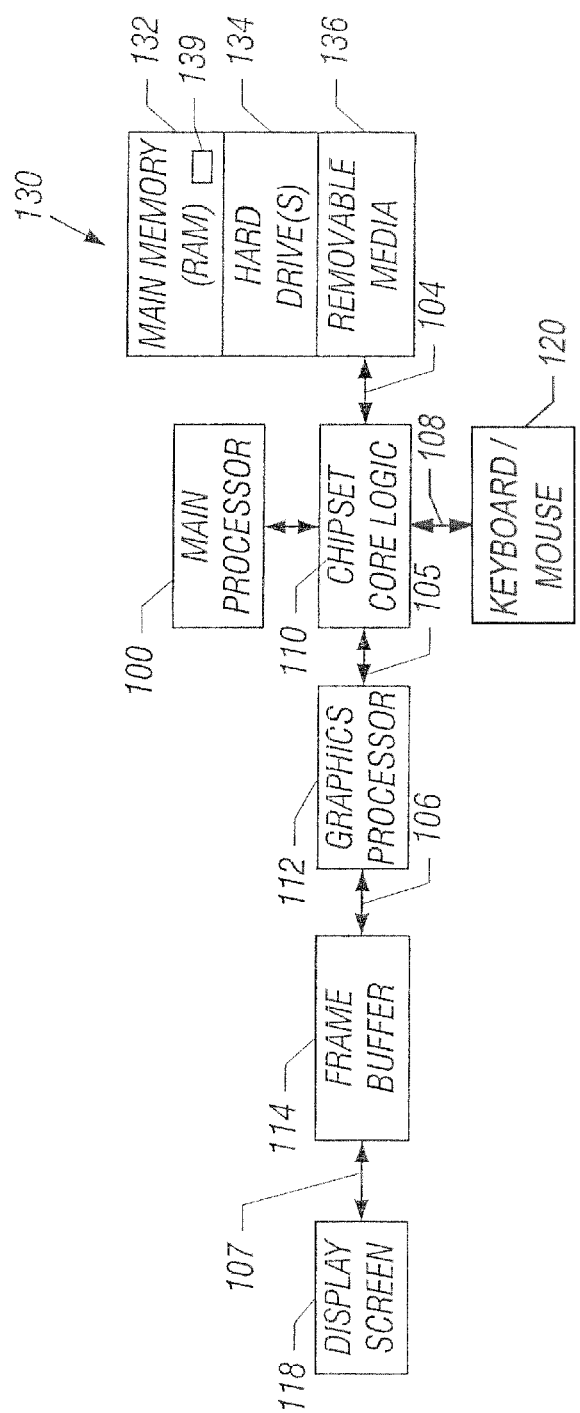
FIG. 4 is a system depiction for one embodiment.

The computer system 130, shown in FIG. 4, may include a hard drive 134 and a removable medium 136, coupled by a bus 104 to a chipset core logic 110. A keyboard and mouse 120, or other conventional components, may be coupled to the chipset core logic via bus 108. The core logic may couple to the graphics processor 112, via a bus 105, and the central processor 100 in one embodiment. The graphics processor 112 may also be coupled by a bus 106 to a frame buffer 114. The frame buffer 114 may be coupled by a bus 107 to a display screen 118. In one embodiment, a graphics processor 112 may be multi-threaded, multi-core parallel processor using single instruction multiple data (SIMD) architecture.

In the case of a software implementation, the pertinent code may be stored in any suitable semiconductor, magnetic, or optical memory, including the main memory 132 (as indicated at 139) or any available memory within the graphics processor. Thus, in one embodiment, the code to perform the sequences of FIG. 3 may be stored in a non-transitory machine or computer readable medium, such as the memory 132, and/or the graphics processor 112, and/or the central processor 100 and may be executed by the processor 100 and/or the graphics processor 112 in one embodiment.

FIG. 3 is a flow chart. In some embodiments, the sequences depicted in this flow chart may be implemented in hardware, software, or firmware. In a software embodiment, a non-transitory computer readable medium, such as a semiconductor memory, a magnetic memory, or an optical memory may be used to store instructions and may be executed by a processor to implement the sequences shown in FIG. 3.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
using a first thread and a library on a central processing unit to spawn a second thread on said central processing unit specifically adapted to synchronize the first thread and a third thread on a graphics processing unit by receiving in the said second thread a request from said third thread, in response sending a system call to an operating system of said central processing unit, said second thread sending a response from the operating system to the third thread; and
using said second thread to synchronize the third thread on a graphics processing unit and the second thread on the central processing unit.

2. The method of claim 1 including using the first thread running on the central processing unit to lock and unlock mutex for a thread on the graphics processing unit.

3. The method of claim 1 including using the first thread to request a lock or unlock mutex for a thread on a graphics processing unit.

4. The method of claim 3 including enabling said central processing unit to notify said graphics processing unit when a mutex is available.

5. The method of claim 1 including using shared virtual memory with said processing units.

6. A non-transitory computer readable medium storing instructions to enable a computer to:
use a first thread and a library on a central processing unit to spawn a second thread on said central processing unit specifically adapted to synchronize the first thread and a third thread on a graphics processing unit by receiving in the said second thread a request from said third thread, in response sending a system call to an operating system of said central processing unit, said second thread sending a response from the operating system to the third thread; and use said second thread to synchronize the third thread on a graphics processing unit and the second thread on a central processing unit.

7. The medium of claim 6 further storing instructions to use the first thread running on a central processing unit to lock mutex for a thread on the graphics processing unit.

8. The medium of claim 7 further storing instructions to use the first thread running on the central processing unit to unlock mutex for a thread on the graphics processing unit.

9. The medium of claim 7 further storing instructions to use the first thread to request a lock or unlock mutex for a thread on a graphics processing unit.

10. The medium of claim 9 further storing instructions to enable said central processing unit to notify said graphics processing unit when a mutex is available.

11. The medium of claim 6 further storing instructions to use shared virtual memory with said processing units.

12. An apparatus comprising:
a graphics processing unit;
a central processing unit coupled to said graphics processing unit; and
a memory shared by said graphics processing unit and said central processing unit, said central processing unit to provide a first thread and a library on a central processing unit to spawn a second thread on said central processing unit specifically adapted to synchronize the first thread and a third thread on a graphics processing unit by receiving in the said second thread a request from said third thread, in response sending a system call to an operating system of said central processing unit, said second thread sending a response from the operating system to the third thread and use said second thread to synchronize the third thread on the graphics processing unit and the second thread on the central processing unit.

13. The apparatus of claim 12 including a graphics processing unit driver on said central processing unit.

14. The apparatus of claim 12, said first thread to lock or unlock mutex for a thread on the graphics processing unit.

15. The apparatus of claim 14, said central processing unit to notify said graphics processing unit when a mutex is available.

16. The apparatus of claim 12 wherein said memory is a shared virtual memory.

17. An apparatus comprising:
a central processing unit;
a memory coupled to said central processing unit; and
said central processing unit to use a first thread to launch a second thread to enable synchronization between a third thread on a graphics processing unit by receiving in the said second thread a request from said third thread, in response sending a system call to an operating system of said central processing unit, said second thread sending a response from the operating system to the third thread and the second thread on the central processing unit.

18. The apparatus of claim 17 wherein said central processing unit to use the first thread to lock and unlock mutex for a thread running on a graphics processing unit.

19. The apparatus of claim 18, said central processing unit to notify said graphics processing unit when a mutex is available.

20. The apparatus of claim 17 including a graphics processor coupled to said central processing unit.

* * * * *